Jan. 12, 1932.  J. E. LEA  1,840,455
APPARATUS FOR THE MEASUREMENT OF GRANULAR MATERIALS
Filed Oct. 19, 1927  2 Sheets-Sheet 1

Inventor:
James E. Lea
By his Attorney: Walker Lunn

Jan. 12, 1932. J. E. LEA 1,840,455
APPARATUS FOR THE MEASUREMENT OF GRANULAR MATERIALS
Filed Oct. 19, 1927 2 Sheets-Sheet 2

Inventor:
James E. Lea.
By his Attorney: Walter Gunn

Patented Jan. 12, 1932

1,840,455

UNITED STATES PATENT OFFICE

JAMES EDWARD LEA, OF MANCHESTER, ENGLAND

APPARATUS FOR THE MEASUREMENT OF GRANULAR MATERIALS

Application filed October 19, 1927, Serial No. 227,305, and in Great Britain November 1, 1926.

This invention relates to sampling apparatus and has for its object to provide means for obtaining a sample and preferably a truly representative sample from granular material in motion, as, for instance, it can be applied to a coal measurer or furnace stoker or to apparatus for the handling of granular materials generally.

According to the invention, means are provided for obtaining a sample, either continuously or intermittently and according to a further feature of the invention such sample is always truly proportional in quantity to the total volume of the material moved.

The invention may be carried into effect in various ways according to the conditions prevailing, for instance, as applied to the coal meter forming the subject of my prior Patent No. 1,773,816, it would depend upon whether both the speed of the conveyor and the depth of material thereon are to be constant or whether one or both of them is or are to be variable.

Where both the speed of the conveyor and the depth of the material thereon are to be constant or where a proportional sample is not required, it is only necessary to arrange for a regular intermittent extraction, as a sample, of a predetermined quantity.

Where either the speed of the conveyor or the depth of the material thereon is variable or where both are variable, and where a proportional sample is required, the amount extracted is varied to be proportional to the volume passing, by varying either the quantity of each extraction or the frequency.

The accompanying drawings illustrate diagrammatically various form of the invention, in which.

Figure 1:
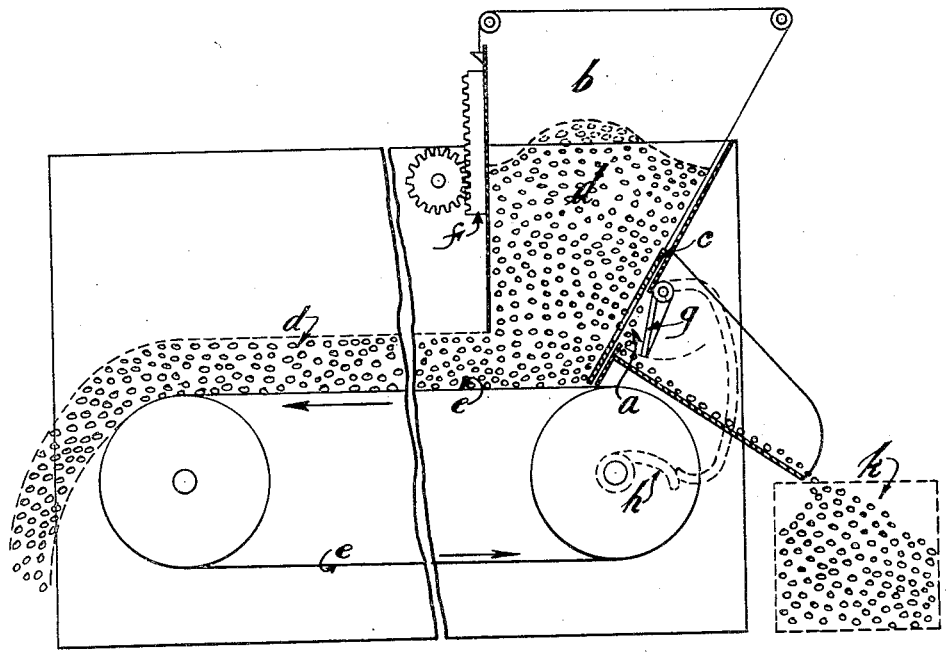
Fig. 1 shows the application of the invention to a meter so as to be controlled directly by the controlling sluice thereof.

As shown in Fig. 1 an opening $a$ is provided in the back of the hopper $b$ over which is arranged on the inside a sliding door $c$ operably connected to open proportionally with the depth of material $d$ passing on the conveyor $e$, being connected to the controlling sluice $f$ of the hopper $b$.

Superimposed over the outside of the opening $a$ is a flap door $g$ adapted also to cover the opening and operated periodically by a cam $h$ from the conveyor mechanism. A chute is provided to convey the samples to a suitable container $k$ the sample falling out of the opening by gravity into and down the chute.

Figure 2:
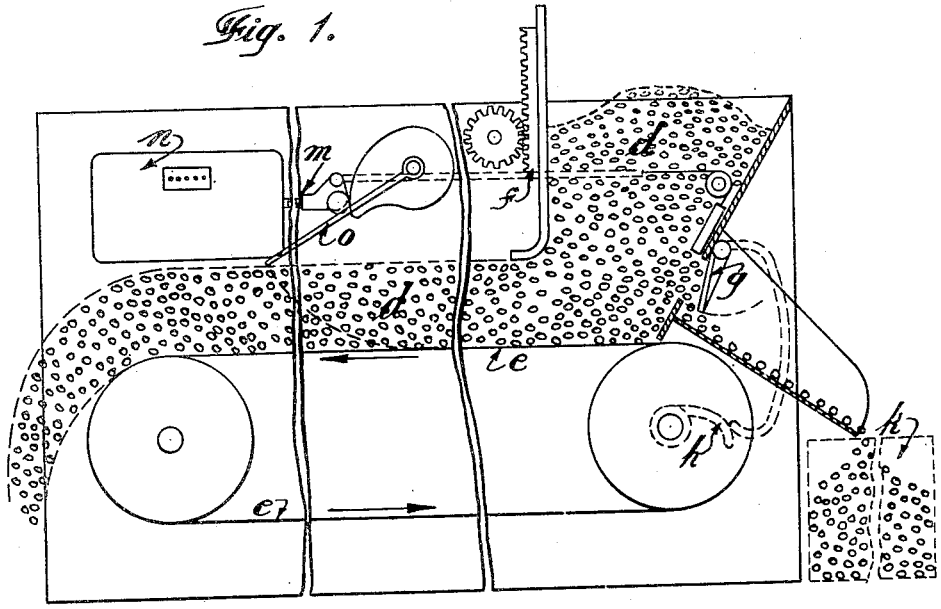
Fig. 2 shows the application of the invention to a meter for direct control by the automatic measuring element thereof.

As shown in Fig. 2 the sliding door $c$ is connected for operation to the variable element $m$ of the integrator $n$ which is directly operated by the measuring element $o$.

It will be seen that the amount of each sample varies directly with the size of the opening which is varied in direct proportion with the depth of material on the conveyor, and the total amount of the samples varies with the number of samples taken, which is directly proportional to the rate of traverse of the conveyor where the amount of each sample is kept constant.

A sample, which may be a truly representative sample of the whole material passing through the meter is therefore obtained independent of variations of speed and thickness of material, and directly proportional to the total amount of the material passed.

Figure 3:
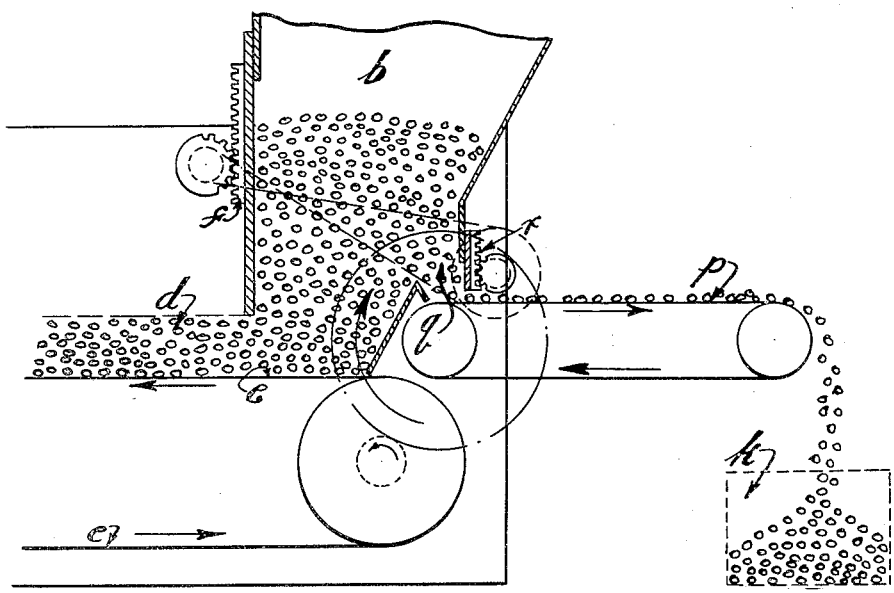
Fig. 3 shows an application of a modification of the invention.

In an alternative construction, as shown in Fig. 3, a small conveyor $p$ is arranged at the back of the hopper having a chute $q$ from the hopper to supply samples to the conveyor, a regulating sluice $r$ being provided above the conveyor, connected directly to the controlling sluice $f$ and operating proportionally with the depth of material $d$ on the main conveyor $e$ and the sample conveyor being driven continually or intermittently from the main conveyor. Such arrangement clearly operates in the same manner as the main conveyor and proportionally therewith in every respect.

In either of these last two examples a measuring element for the sample conveyor may be provided in place of or in addition to the controlling sluice, and connected to the measuring element of the main conveyor so that the measuring element on the main conveyor would be the ultimate controlling factor for the sampler.

The invention therefore provides a collected sample which may be truly representative of the whole of the material passing, and thus provides an approximate sample or an accurately proportional sample from which the total weight of the material which has passed through the meter may be calculated by enabling the average weight of the material to be ascertained, it being only necessary to obtain from the sample the weight per cubic foot and multiply that figure by the meter reading.

Various mechanical means equivalent to those described may be obviously employed without departing from the nature of the invention as herein set forth.

It will be obvious that the invention is equally applicable to apparatus wherein the passage is effected by a ram or the like, as in a ram-type stoker and that variation in the amount of the extracted portions includes variation in the number of the portions or the volume of each portion, or both.

What I claim is

1. Apparatus for delivering granular material comprising, a hopper for the material, a chute leading from said hopper, a conveyor forming the bottom of said hopper on which the material passes from the hopper, means for regulating the depth of material on the conveyor, an outlet door in said hopper and means connected to the depth regulating means of the conveyor for varying the effective outlet from said outlet door proportionally with the depth of material on the conveyor, as set forth.

2. Apparatus for delivering granular material comprising a hopper for the material, a chute leading from said hopper, a conveyor forming the bottom of said hopper on which the material passes from the hopper, means for regulating the depth of material on the conveyor, an outlet door in said hopper, a sliding shutter over said outlet door, means operably connecting said shutter to the depth regulating means of the conveyor so as to vary the effective outlet from the said outlet door proportionally with the depth of the material on the conveyor, as set forth.

3. Apparatus for delivering granular material comprising a hopper for the material, a chute leading from said hopper, a conveyor forming the bottom of said hopper on which the material passes from the hopper, means for regulating the depth of material on the conveyor, an outlet door in said hopper, a pivoted flap door over said outlet door and means operated from the conveyor for opening and closing said door, as set forth.

In testimony whereof I have signed my name to this specification.

JAMES EDWARD LEA.